United States Patent [19]

Masuda

[11] Patent Number: 4,645,027

[45] Date of Patent: Feb. 24, 1987

[54] AUTOMATIC SPEED CONTROL SYSTEM FOR MOTORCYCLES

[75] Inventor: Yutaka Masuda, Fukuroi, Japan

[73] Assignee: Yamaha Hatsudoki Kabushiki Kaisha, Iwata, Japan

[21] Appl. No.: 645,494

[22] Filed: Aug. 29, 1984

[30] Foreign Application Priority Data

Aug. 31, 1983 [JP] Japan .............................. 58-160037

[51] Int. Cl.⁴ ....................... B60K 31/08; B60K 31/18
[52] U.S. Cl. .................................... 180/176; 180/175; 180/219
[58] Field of Search ................ 180/175, 176, 177, 219

[56] References Cited

U.S. PATENT DOCUMENTS 3,092,090  6/1963  Berninger ........................... 180/177
3,406,775  10/1968  Magnuski ........................... 180/176
4,133,407  1/1979  Schantz .............................. 180/177

Primary Examiner—Albert W. Davis, Jr.
Attorney, Agent, or Firm—Ernest A. Beutler

[57] ABSTRACT

An automatic speed control mechanism for a motorcycle that embodies a separately driven vacuum pump for controlling the throttle valve of the motorcycle independently of its induction system vacuum. In addition, an indicator system is provided that indicates when the automatic speed control is operative and further which indicates the preset speed and the actual speed of travel. A manual arrangement is provided for manually overriding the automatic speed control so as to reduce vehicle speed without disabling the automatic speed control device.

6 Claims, 6 Drawing Figures

AUTOMATIC SPEED CONTROL SYSTEM FOR MOTORCYCLES

BACKGROUND OF THE INVENTION

This invention relates to an automatic speed control system for motorcycles and more particularly to an improved power source for such automatic speed controls and an improved indicating system for such devices.

The use of automatic speed control devices, commonly called "cruise controls", has been widely accepted with automobiles. Although such devices have been applied primarily to automobiles, there are a number of advantages to utilizing such systems in connection with motorcycles. Many of the automotive advantages apply equally well to motorcycles and, furthermore, there are additional reasons why such devices are particularly useful in connection with motorcycles. In spite of their utility in motorcycle applications, there have been some factors which have precluded their use.

For example, all of the typical automotive speed control devices employ a vacuum motor for automatically positioning the throttle valve of the engine to maintain the vehicle speed at the preset value. Such a power source is not particularly adaptable for motorcycles since the motorcycle engine does not normally provide sufficient induction system vacuum to operate the throttle valve. In addition, the use of intake manifold vacuum as the power source could adversely affect the running of the motorcycle.

It is, therefore, a principal object of this invention to provide an improved speed control device for a motorcycle.

It is another object of this invention to provide a motorcycle speed control that is independent of engine induction system vacuum for its power.

It is a further object of this invention to provide an improved vacuum power source for a speed control system.

In an automotive speed control, the operator normally removes his foot from the accelerator pedal during automatic speed control operation. With a motorcycle, on the other hand, the rider will normally keep his hand on the accelerator handgrip even when operating in a speed control mode. Furthermore, even when operating in the speed control mode, it is desirable to permit the rider to temporarily decelerate the motorcycle without completing disabling the automatic speed control.

It is, therefore, a further object of this invention to provide an improved indicating device for indicating to the rider when the speed control is operative.

It is another object of the invention to provide an indicator for the automatic speed control of a motorcycle that will indicate the deviation of the operator controlled speed from that for which the automatic speed has been set.

SUMMARY OF THE INVENTION

A first feature of this invention is adapted to be embodied in an automatic speed control for a motorcycle comprising throttle means for controlling vehicle speed, operator control means for selectively positioning the throttle means, and automatic speed control means for operating the throttle means to operate the vehicle at a preset speed. In accordance with this feature of the invention, power means powered independently of the induction system vacuum are incorporated as a part of the automatic speed control means for operating the throttle valve.

Another feature of the invention is also adapted to be embodied in an automatic speed control for a motorcycle. Such an automatic speed control includes throttle means for controlling the vehicle speed, operator control means for selectively positioning the throttle means and automatic speed control means for operating the throttle means to operate the vehicle at a preset speed under selective control of the operator. In accordance with this feature of the invention, there is provided an indicator of actual vehicle speed and an indicator of the preselected speed.

Yet another feature of the invention is also adapted to be embodied in an automatic speed control for a motorcycle that includes throttle means for controlling the vehicle speed, operator control means for selectively positioning the throttle means and automatic speed control means for selectively operating the throttle means to operate the vehicle at a preset speed. In accordance with this feature of the invention, indicator means are provided for giving an indication of when the automatic speed control means is selectively operable.

DETAILED DESCRIPTION OF THE PREFERRED EMBODIMENT

Figure 1:
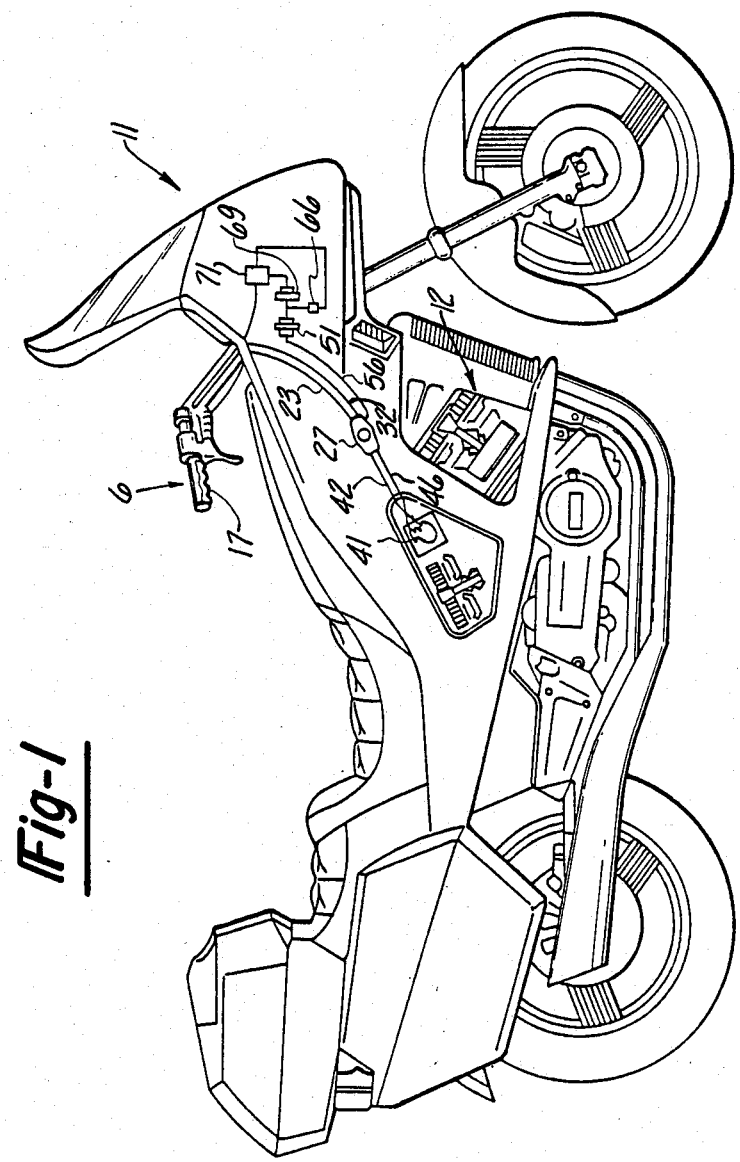
FIG. 1 is a side elevational view of a motorcycle having an automatic speed control mechanism constructed in accordance with an embodiment of the invention.

In the drawings, the reference numeral 11 indicates generally a motorcycle having a speed control mechanism constructed in accordance with the invention. The motorcycle 11 includes an engine, indicated generally by the reference numeral 12, which has an engine speed control device. In the illustrated embodiment, the engine 12 is of the type that includes one or more carburetors, indicated generally by the reference numeral 13, and which includes a throttle valve 14 that is rotatably journaled on a throttle valve shaft 15 for controlling the speed of the associated engine 12 in a known manner.

The motorcycle 11 is equipped with a handbar assembly 16 that carries at one of its ends a rotatable accelerator grip 17. The accelerator grip 17 is juxtaposed to a control box 18 that contains a speed control switch 19 and a kill switch 21. The kill switch 21 is provided for selectively disabling or stopping the engine 12. The speed control switch 19, as will become apparent, is operative to control an automatic speed control for controlling the speed of the engine 12 in a manner to be described.

Within the control box 18, the accelerator grip 17 is provided with a cam member 22 that is rotatably affixed to the accelerator grip 17. A throttle opening control wire 23 is provided that is comprised of a wire actuator 24 that has one of its ends affixed to the cam 22, as by a ferrule 25. The bulk of the length of the wire 24 is surrounded by a protective sheath 26. The opposite end of the wire 24 passes into a coupling device, indicated generally by the reference numeral 27, and which includes a rotatable control member 28. This end of the wire 24 is affixed to the rotatable control member 28, as by means of a ferrule 29. In this way, motion may be transmitted from the accelerator grip 16 to the control member 28 in a throttle opening direction, as will be described. The control member 28 is rotatably journaled in a suitable manner in a casing 31 of the coupling device 27.

A throttle closing wire, indicated generally by the reference numeral 32, has a wire actuator 33 which is connected at one of its ends to the cam 22 by means of a ferrule 37. Like the throttle opening wire actuator 23, the major portion of the length of the control wire 36 is encircled by a protective sheath 38. The opposite end of the throttle closing wire 36 is connected to the control member 28 by means of a ferrule 39.

Figure 3:
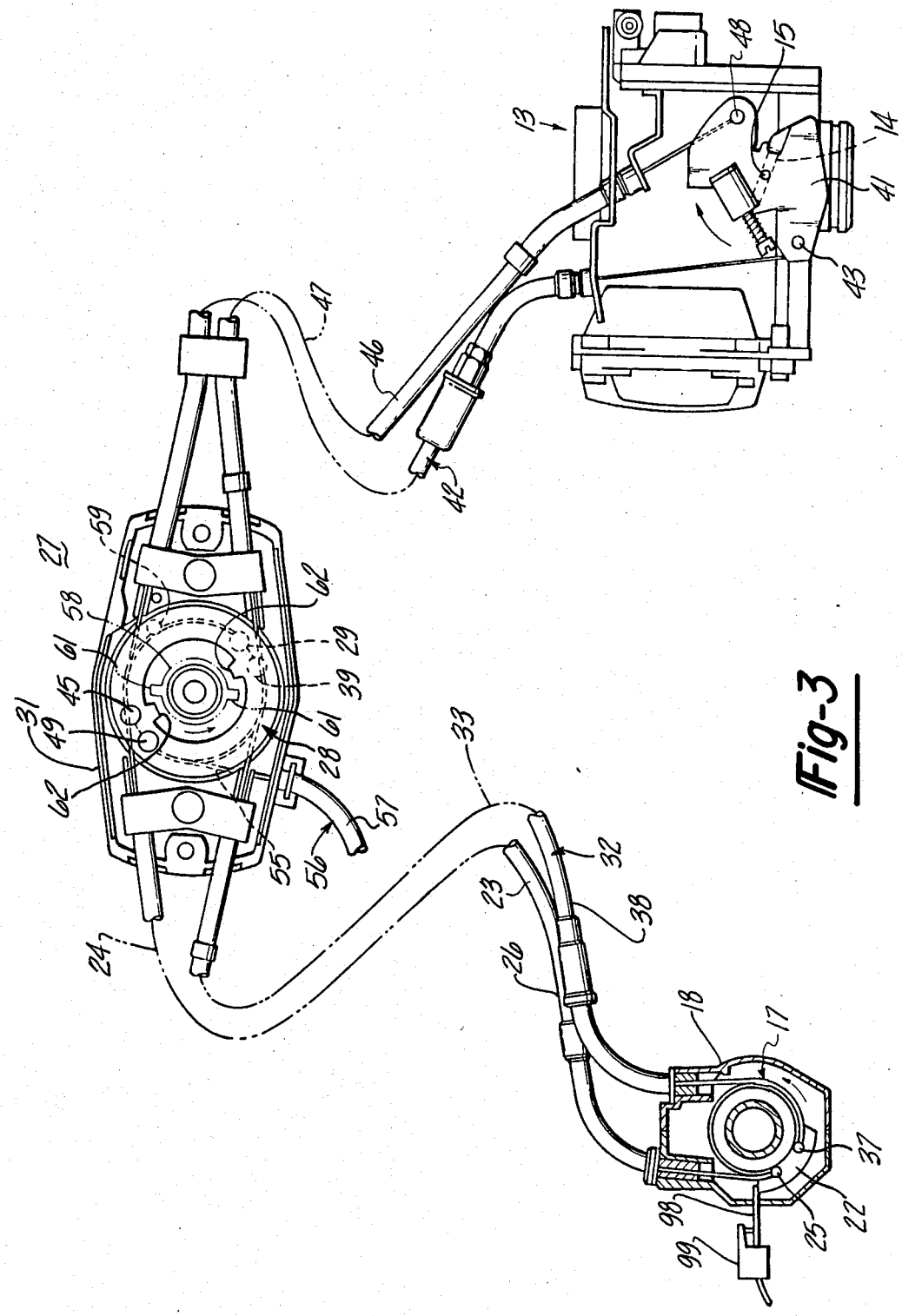
FIG. 3 is a partially schematic perspective view showing the construction of the throttle actuating mechanism of the embodiment.

Rotation of the accelerator grip 16 in a counterclockwise direction as viewed in FIG. 3 places a tension on the throttle opening wire 24 which will rotate the control member 28 also in a clockwise direction. This direction is indicated by the solid arrow in FIG. 3. Rotation in the opposite direction will tension the throttle closing wire 36 and will rotate the control 28 in a throttle closing direction.

An actuating lever 41 is affixed to the throttle valve shaft 15 for rotatably positioning the throttle valve 14. A throttle opening control wire, indicated generally by the reference numeral 42, has a control wire 43 that is affixed at one of its ends to the lever 41 by means of a ferrule 44. The opposite end of the throttle opening control wire 43 is affixed to the control member 28 by means of a ferrule 45.

A throttle closing control wire assembly, indicated generally by the reference numeral 46, has a throttle closing control wire 47 that is affixed at one end to the lever 41 at a point spaced on the opposite side of the ferrule 44 by means of a ferrule 48. In addition, a throttle closing return spring (not shown) is provided that is operative on the lever 41 for biasing the throttle valve 14 to its closed or idle position. The opposite end of the throttle closing control wire 47 is affixed to the control member 28 by means of a ferrule 49.

Because of the aforedescribed connection, rotation of the control member 28 in a counterclockwise direction causes a tension to be exerted on the throttle opening control wire 43 so as to rotate the lever 41 and throttle valve 14 in a clockwise or opening direction. Clockwise rotation of the control member 28 will cause the throttle closing control wire 47 to be tensioned and rotate the lever 41 and throttle valve 14 in the closing direction. As has been previously noted, this rotation is also assisted by the return spring. It should be readily apparent, therefore, that a positive connection is provided between the accelerator grip 17 and the carburetor throttle valve 14 so that these two elements will be interdependent upon each other for their positioning.

In accordance with the invention, the motorcyle 11 is also provided with an automatic speed control including an actuator device, indicated generally by the reference numeral 51. The actuator device 51 is comprised of a vacuum motor 52 that includes a diaphragm 53 that is connected by means of a connector 54 to one end of a control wire 55 of a automatic control wire assembly, indicated generally by the reference numeral 56. The major portion of the length of the control wire 55 is encircled by a protective sheath 57. The opposite end of the control wire 55 extends into the coupling device 27 and is specifically connected to an actuating element 58 that is journaled within the housing 31 for rotation relative to the control member 28 in an appropriate manner. A ferrule 59 provides the connection between the actuating wire 55 and the actuating element 58. The actuating element 58 is provided with a pair of lugs 61 that are adapted to engage, at times, lugs 62 formed on the control member 28. The lugs 61 and 62 provide, in effect, a lost motion connection between the actuating element 58 and the control member 28 so that the control member 28 may freely move in a throttle opening direction without interference from the actuating element 58. However, rotation of the actuating element 58 in the throttle opening position will cause the lugs 61 to engage the lugs 62 and to open the throttle valve 14 in a manner to be described.

Figure 2:
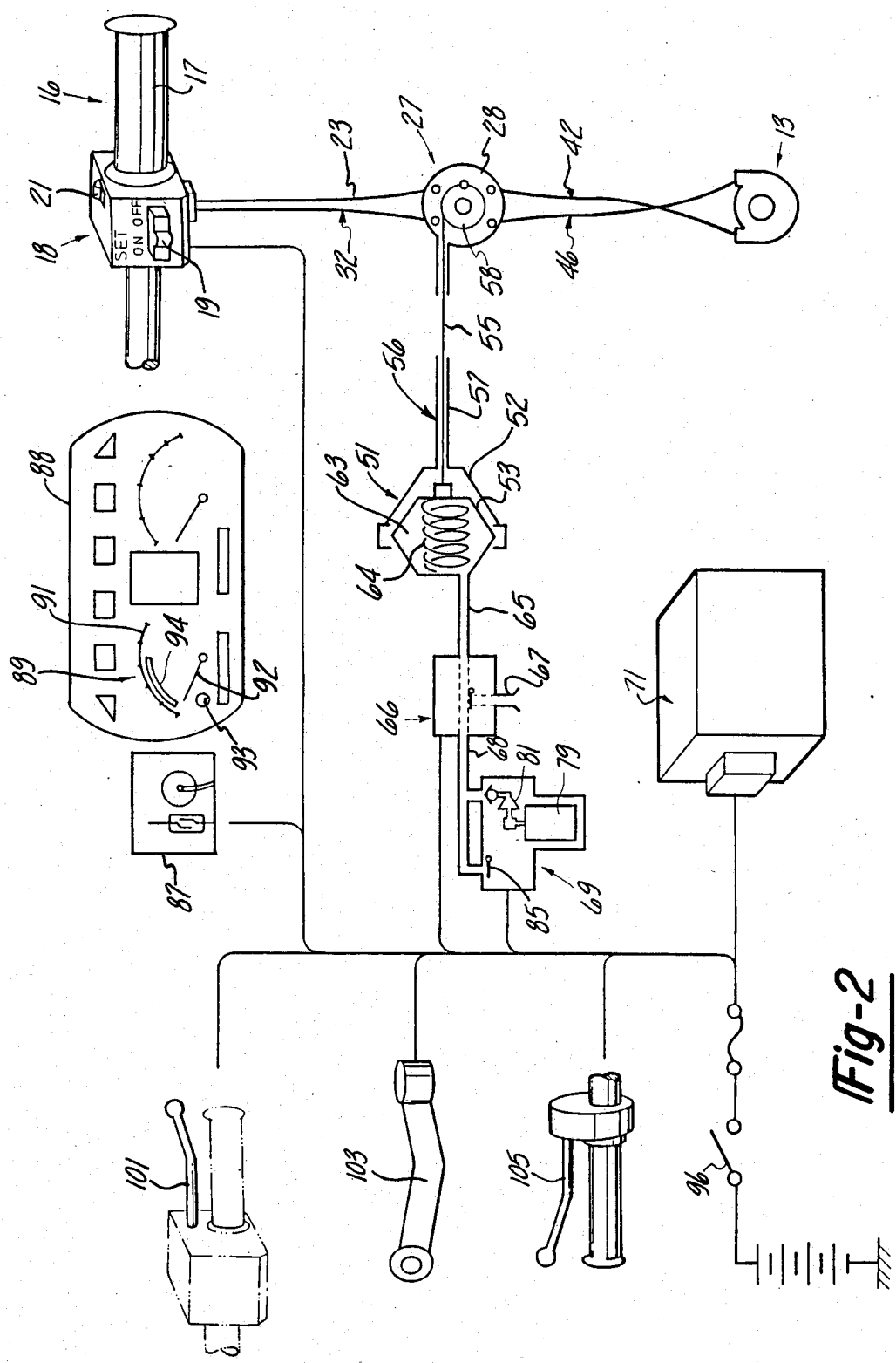
FIG. 2 is a partially schematic view showing the automatic speed control mechanism and its various controls.
Figure 4:
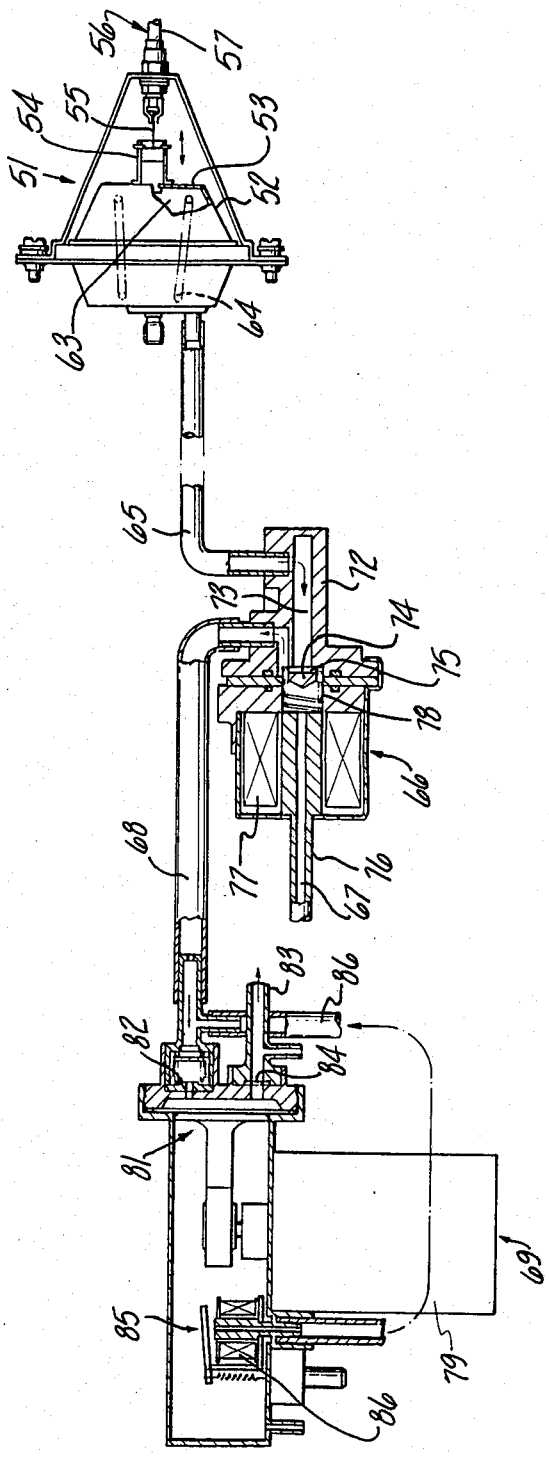
FIG. 4 is a side elevational view, with portions shown in section, of the power device of the automatic speed control.

Referring now primarily to FIGS. 2 and 4, the actuating device 51 and specifically the diaphragm 53 forms a chamber 63 in which a coil compression spring 64 is contained for normally urging the diaphragm 53 in a throttle closing direction. The chamber 63 is connected to a conduit 65 which extends from a control valve assembly 66. The control valve assembly 66 is adapted to connect the conduit 65 to either an atmospheric vent 67 or a vacuum line 68. The vacuum line 68 is fed by an electrically operated vacuum pump 69. The vacuum pump 69 and control valve 66 are controlled by a control box 71 that is operative so as to control the vacuum pump 69 and valve 66 when actuated so as to maintain a preset vehicle speed.

The control valve assembly 66 is comprised of a main housing 72 in which a passageway 73 is formed that communicates with the conduit 65.

The passageway 73 terminates at a valve seat 74 that has a radially extending passage 75 formed at its base that communicates the passageway 73 with the vacuum conduit 68 at all times.

The atmospheric vent 67 is formed in a plunger 76 that is slidably supported within a solenoid winding 77 which is, in turn, contained within the housing 72. A coil compression spring 78 normally urges the plunger 76 to the left, as viewed in FIG. 4, so as to maintain the atmospheric vent passage 67 spaced from the valve seat 74 so as to bleed atmospheric air into the passage 73 and effectively disable the diaphragm 53.

The vacuum pump 69 includes an electric driving motor 79 which operates a vacuum pumping element 81 that draws air from the conduit 68 through a check valve 82 and discharges it to the atmosphere through an atmospheric conduit 83 and check valve 84. In this way, operation of the pumping element 81 will effectively evacuate the line 68.

In order to modulate the amount of vacuum generated by the pump 69, an atmospheric bleed valve 85 is provided in a conduit 86 that tees into the vacuum line 68. As the valve 85 is opened, it will bleed atmospheric air into the line 68 and decrease the amount of vacuum generated by the pump 69 so as to modulate the position of the diaphragm 53. The valve 85 may be of the electrically controlled type and includes a solenoid winding 86.

When the operator decides to control the motorcycle 11 in an automatic speed control mode, the set switch 19 is closed. At this time a comparator, indicated generally by the reference numeral 87, will note the actual speed of travel of the motorcycle 11 and provide a signal to the control box 71 of the preset speed. The vacuum pump 69 and control valve 66 will then be operated so as to actuate the vacuum motor 52 and move the diaphragm 53 so that the wire 55 is tensioned and rotate the actuating element 58 so as to rotate the control member 28 to maintain the throttle valve 14 in the preset position necessary to maintain the desired vehicle speed. It should be noted that the vacuum motor 52 exerts sufficient force on the control member 28 and on the throttle valve 15 so as to overcome the force of the return spring. Thus, it is possible to maintain automatic speed control under this mode.

Figure 5:
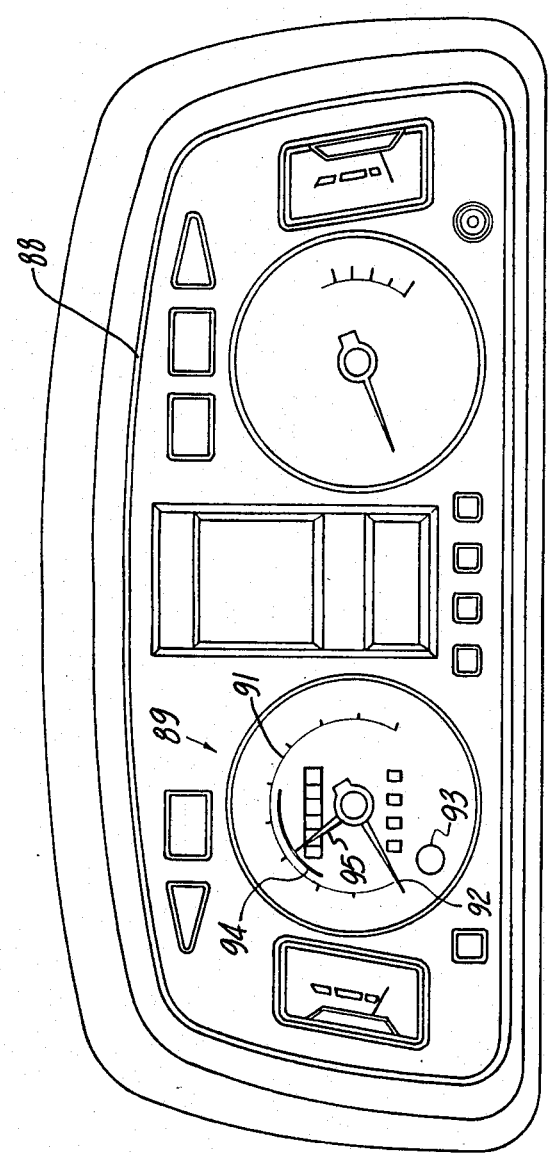
FIG. 5 is a perspective view showing the dashboard of the motorcycle.

The motorcycle 11 is provided with a dashboard 88 (FIGS. 2 and 5) that includes among its instruments a speedometer 89 that has a calibrated gauge 91 so as to indicate speed. A first, relatively long needle 92 is driven by the speed sensing mechanism so as to indicate the actual speed of travel of the motorcycle 11. In addition, when the speed control switch 19 is turned on, an indicator light 93 positioned adjacent the speedometer 89 or within its face will be illuminated so as to provide the rider with an indication that the speed control has been activated. The reason for this will become apparent.

In addition to having the speed gauge 91, the speedometer 89 and specifically its face, is banded with a color band 94, which is preferably of the same color as the indicator light 93, which indicates the permissible range or operating range through which the automatic speed control device is operative. Thus, the operator can tell by the position of the needle 92 and the band 94 if he is operating at a speed which setting of the speed control by closing the switch 19 will permit the travelled speed to be maintained.

In addition to the needle 92, there is provided a further needle 95 which operates together with the needle 92 at such times as when the speed control is not switched on. That is, when the switch 19 is off, the needles 92 and 95 will rotate together. Through a suitable mechanism, when the switch 19 is closed, the needle 95 will be locked in position so as to indicate to the operator the actual speed which he has preset for the automatic speed control device. The reason for this will also become apparent as the description proceeds.

If the operator desires to deactivate the automatic speed control, this may be done in any of a number of ways. In addition, the operator can override the automatic speed control and cause deceleration of the engine 12 and motorcycle 11 even when still operating in the automatic mode. This later operation will be described first.

As has been previously noted, the accelerator grip 17 is directly coupled to the throttle valve 14 through the control wire arrangement previously described. Thus, if the operator rotates the accelerator grip 17 in a throttle closing direction, even when the automatic speed control is engaged, the throttle closing wire 36 will be tensioned and the control member 28 will be rotated in a clockwise direction. This is possible since the force exerted by the operator control is greater than the force exerted by the automatic speed control and specifically the vacuum motor 52. Therefore, the operator is able to overcome the actuator 52 and effect manual throttle closing even when the automatic speed control is set.

Since it is possible for the rider to decrease the speed of the motorcycle 11 even when the speed control device is switched on, the needle 95 and indicator light 93 are useful in warning the operator that the speed control is still operative even though he has changed the speed of travel and the speed which will be resumed in the event he releases his pressure on the accelerator grip 17. Thus, the operator is provided with a forewarning of the conditions that will exist and an additional factor of safety is provided.

Figure 6:
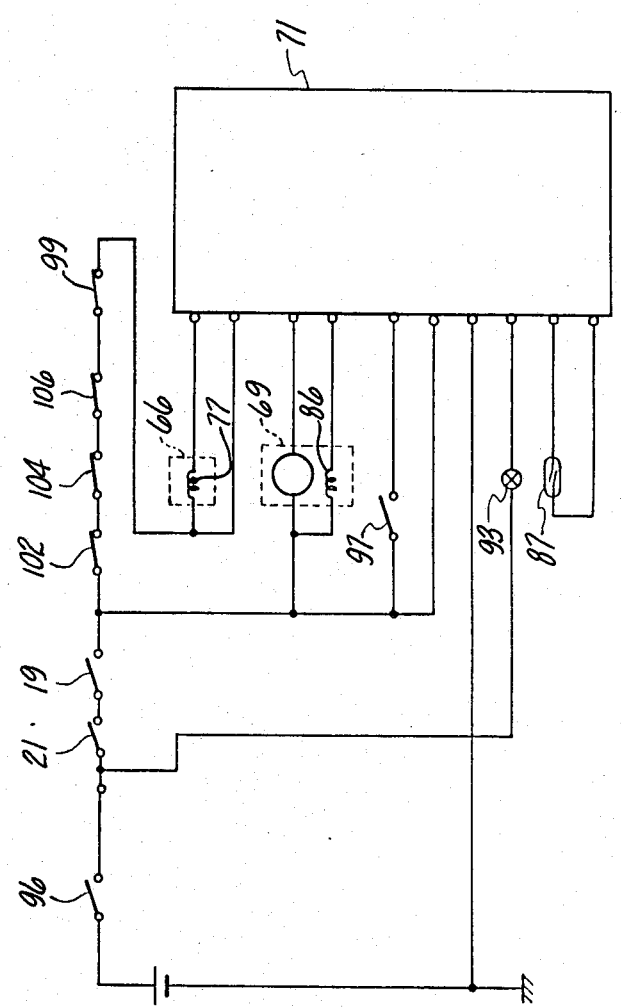
FIG. 6 is a schematic view showing the wiring diagram of the automatic speed control.

Referring now to the circuit schematic of FIG. 6, it should be noted that the automatic speed control mechanism and specifically the control box 71 is wired in circuit with the kill switch 21 and the speed control switch 19. In addition, a main ignition switch 96 is provided in this circuit. Thus, the operator may deactivate the automatic speed control either by turning the speed control switch 19 off or by opening the kill switch 21.

When the speed control switch 19 is closed so as to initiate the speed control, a holding relay switch 97 will also be activated so as to close the circuit to the control box 71. There are provided in the circuit for the automatic control of the speed control a series of disabling switches so as to deactivate the speed control under a number of additional operator controls independent of the main speed control switch 19 or the kill switch 21.

For example, if the operator wishes to completely deactivate the automatic speed control, he need merely rotate the accelerator grip 17 to the idle position wherein the cam 22 will engage a contact 98 of a disable switch 99 of the speed control (FIG. 3). Then, the control unit 71 will be automatically deactivated. This switch 99 is contained within the control box 18 and is sealed within it. Alternatively, the disable switch may be mounted on the carburetor 13 so as to be engaged by the lever 41 when it is moved to its idle position.

In addition to the disabling of the automatic speed control by moving of the manual throttle to its idle position, it is also possible to disable it by operating the front hand brake control 101, which opens a switch 102, the rear brake control 103, which opens a switch 104 or the clutch control 105, which opens a switch 106. These disabling switches are all of a known type and are operated in the control circuit with the control box 71 in a known manner.

It should be readily apparent that the described arrangement permits a very effective speed control for a motorcycle and further permits the operator to manually override the speed control and reduce the speed of the vehicle without disabling the automatic speed control. In addition, the automatic speed control may be switched off in any of a plurality of manners. When this is done, the control device 71 shuts off the vacuum pump 69 and opens the valve 66 to the atmospheric vent 67 so as to disable the vacuum motor 52. In addition, when the speed is manually reduced by the rider while the speed control device is still engaged, the rider will be given a signal that the speed control is still operative and furthermore the operator will be provided with an indication as to the preset speed by the needle 95.

Although an embodiment of the invention has been illustrated and described, various changes and modifications may be made without departing from the spirit and scope of the invention, as defined by the appended claims.

What is claimed is:

1. In an automatic speed control for a motorcycle comprised of a dirigible front wheel, a rear wheel, an engine and means for driving said rear wheel from said engine, comprising throttle means for controlling motorcycle speed, operator control means for selectively positioning said throttle means, and automatic speed control means for operating said throttle means to operate the motorcycle at a preset speed, the improvement comprising said automatic speed control means having power means powered independently of the induction system vacuum of the engine for operating said throttle means comprising an electrically driven vacuum pump and means incorporated within said vacuum pump operative to provide a variable degree of vacuum for positioning said throttle means.

2. In an automatic speed control as set forth in claim 1 wherein the power means comprises a vacuum motor operated by the vacuum pump and further including an atmospheric vent for selectively venting the vacuum motor to atmosphere to disable the vacuum motor.

3. In an automatic speed control as set forth in claim 1 further including means for manually overriding the automatic speed control means by the operator control means for reducing the speed of travel of the vehicle without disabling the automatic speed control means.

4. In an automatic speed control as set forth in claim 3 further including means for indicating the variation in speed between the preset speed and the actual speed of travel of the vehicle.

5. In an automatic speed control as set forth in claim 1 further including means for providing a visual inducation of operation of the automatic speed control means.

6. In an automatic speed control as set forth in claim 5 wherein the means for providing the indication of automatic speed control operation comprises a colored indicator light and further including a speedometer for the vehicle having a color coded band of the same color indicating the permissible band of automatic speed control operation.

* * * * *